Dec. 13, 1966   W. KAFKA   3,292,016
SUPERCONDUCTING THREE-PHASE CURRENT CABLE
Filed Sept. 23, 1963   2 Sheets-Sheet 2

United States Patent Office 3,292,016
Patented Dec. 13, 1966

3,292,016
SUPERCONDUCTING THREE-PHASE CURRENT CABLE
Wilhelm Kafka, Tennenlohe 164, near Erlangen, Germany, assignor to Siemens-Schuckertwerke Aktiengesellschaft, Berlin-Siemensstadt, Germany, a corporation of Germany
Filed Sept. 23, 1963, Ser. No. 310,942
Claims priority, application Germany, Sept. 22, 1962, S 81,608
10 Claims. (Cl. 307—90)

My invention relates to transmission of alternating current by superconducting cable and particularly to superconducting transmission means for three-phase current.

Superconducting lines have been proposed for transmitting direct-current. This is feasible because for particular superconducting temperatures the currents necessary to produce the critcal magnetic field strength at which superconductivity is first inhibited are high. Thus superconducting cables are suitable for reasonable current flows.

Transmission of three-phase power involves eddy currents. These suppress currents at the conducting surfaces and can produce local concentration of magnetic fields beyond the critical field value, causing the conductor to lose its superconductivity. This undesirable effect can be obviated with consistency only by loading the conductor with a much smaller current than a corresponding conductor transmitting direct current.

It is an object of the present invention to produce an improved multi-phase current transmission system. Another object of the invention is to produce a three-phase current transmission system which avoids the above disadvantages and obviates the energy losses inherent therein.

According to a feature of my invention, I construct each phase conductor of a multi-phase current cable out of one or several concentrically arranged superconducting double conductors, and I connect the individual load phases across the inner and outer conductors, and connect the phases with each other only at one end of the three-phase current cable.

By virtue of the concentric arrangement, current diminution occurs equally over the entire surface of the conductor and thus obviating current rises at specific points and corresponding field concentrations.

Preferably, the diameter ratio of inner and outer conductors approaches the value 1. Thus the wave impedance $$Z = \sqrt{\frac{L}{C}}$$

of the cable is as small as possible and the naturally transmittable power corresponding to $N_n = V^2/Z$ is as high as possible. In arrangements with the variable transmission powers, I preferably provide each phase with several concentric double conductors so that according to the time dependent transmission power the number of the connected double conductors can be altered. This affords automatically switching in and out the necessary three-phase current circuits in dependence upon particular operating functions, such as power factor.

Other objects, features and advantages of the invention will become obvious from the following detailed description of various embodiments thereof when read in light of the accompanying drawings wherein.

Figure 1:
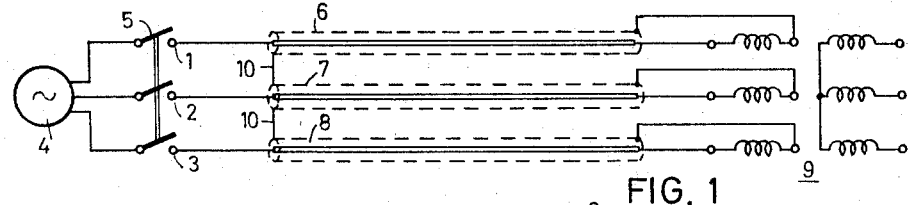
FIG. 1 is a partially schematic circuit diagram of a three-phase superconducting cable system according to the invention.

In FIG. 1 a three-phase current source 4 has three phase outputs connectable by means of main switch 5 to three terminals 1, 2 and 3. Three double conductors, or lines, 6, 7 and 8 are each comprised of two concentric conductors, of a three-phase current cable. The terminals 1, 2 and 3 lead through the inner conductors of the lines 6, 7 and 8 to the phase terminal points of a three-phase load, namely onto the ends of the primary windings of a three-phase current transformer 9. The other ends of the primary windings of the three-phase current transformer 9 connect to the outer conductors of the lines 6, 7 and 8. At the end of the three-phase current cable nearer the three-phase current source 4 a connection 10 joins the individual phases to form a Y-connection. The three phases can also be connected at the source end, where necessary, into a delta connection, each double conductor being connected across one source phase.

Figure 2:
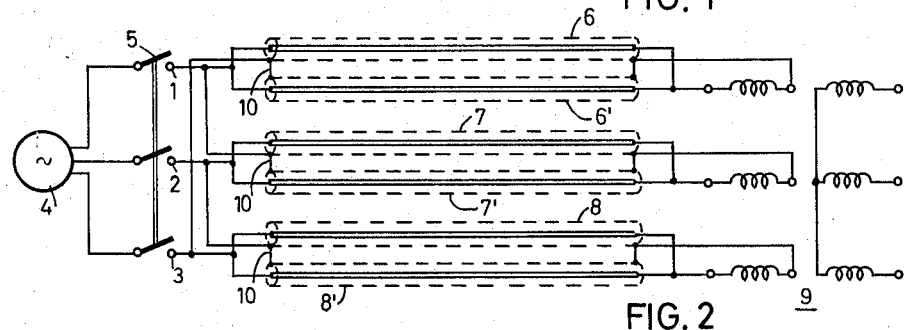
FIG. 2 is another embodiment of FIG. 1.

FIG. 2 illustrates an arrangement similar to FIG. 1 wherein two double conductor lines 6 and 6', 7 and 7', and 8 and 8' are respectively parallel-connected in each phase. For each half-wave the inner conductors carry current in one direction and the outer conductors carry current in the other direction. Here the individual phases are delta-connected at the source end. However a Y-connection is also contemplated.

Figure 3:
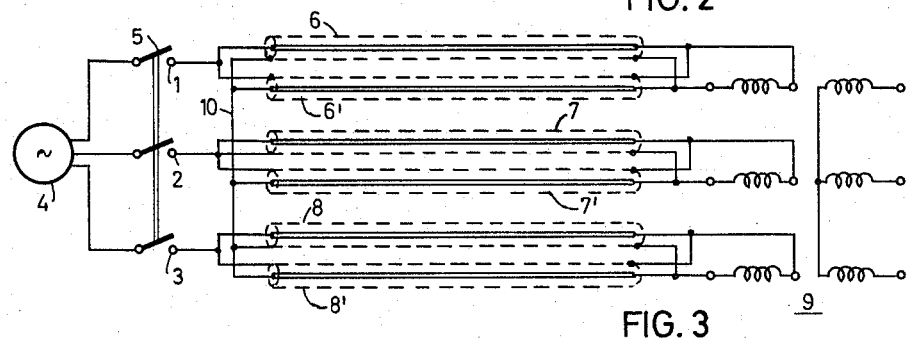
FIG. 3 is another embodiment of FIG. 1.

FIG. 3 illustrates another embodiment of the apparatus according to FIG. 1. Again the current of each phase is distributed among the parallel conductors of two double-conductor leads. It differs from the apparatus according to FIG. 2 in that current is carried by the inner conductor of one lead and the outer conductor of the other lead, and reverse current is carried by the outer conductor of the one lead and the inner conductor of the other lead in each pair of parallel leads connecting one phase.

Figure 4:
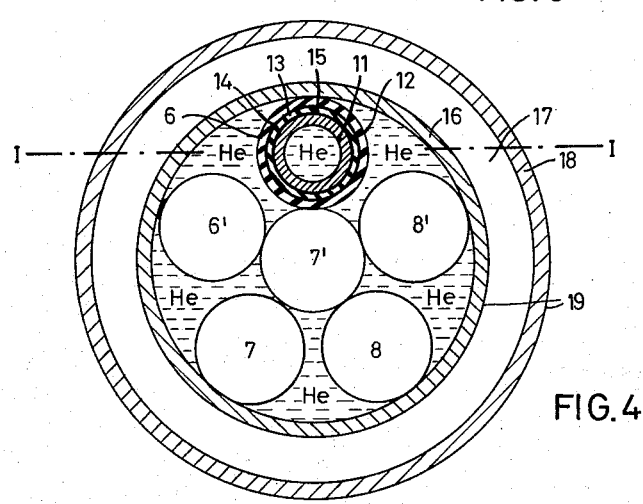
FIGS. 4 and 5 are cross sections of two embodiments of the cables in FIG. 2 and 3.

FIG. 4 illustrates cross-sectionally the construction of the three-phase current cable according to the invention (FIGS. 2 and 3). It comprises six concentric double-conductor lines 6, 6', 7, 7', 8 and 8' wherein respective line pairs 6 and 6', 7 and 7', 8 and 8' belong to each phase and can be connected in parallel as in FIGS. 2 or 3. The cross section of FIG. 1 is identical to that shown in FIG. 4 except that only three double conductor lines 6, 7 and 8 exist. Each concentric line consists of a metal tube 11 carrying a flow of fluid helium He to produce the low temperature necessary for superconduction, and is surrounded on the outside with a superconducting layer 12 which forms one conductor of the concentric double conductors 6, 6', 7, 7', 8 and 8'. The conducting material 12 is composed of a niobium zirconium compound preferably in the form of NbZr. It may also be a niobium tin compound preferably in the form of Nb$_3$Sn. Enclosing the superconducting surface 12 is an electronic insulation surface 13 jacketed by a superconducting layer 14 corresponding to layer 12. A second electrically insulating layer 15 surrounds the before-mentioned double conductors. Six such double-conductor lines are arranged in a tube 16, and the space intermediate the individual double strands and conductor 16 is filled with liquid helium, partly vaporized. Tube 16 is surrounded by a highly evacuated empty space 17 formed by a surrounding jacket 18. Brightly polished metal foils 19 coating the interior of the space 17 or several such foils concentrically arranged within the space 17 minimizes the effects of heat rays. If necessary and according to another feature of the invention, it is possible to fill the space 17 with a heat insulating glass web or powder available under the name trademark Aerogel which can be admixed with 50% aluminum powder. According to another feature of the invention the losses through heat radiation, which rise approximately according to the fourth power of the temperature drop of the media to be insulated from one another, is reduced by means of several double jackets inside the jacket 18 and separated from each other by various fluid gases for example nitrogen at 77° K., methane at 111° K., ethylene at 170° K., pressurized liquid $CO_2$ at approximately 220° K. or ammonia at 240° K. This step-wise subdivision of the temperature drop from the ambient temperature to that inside the tube 16, namely the temperature of liquid helium (4.2° K.), minimizes the losses of the refrigerating device due to heat penetration and radiation.

Figure 5:
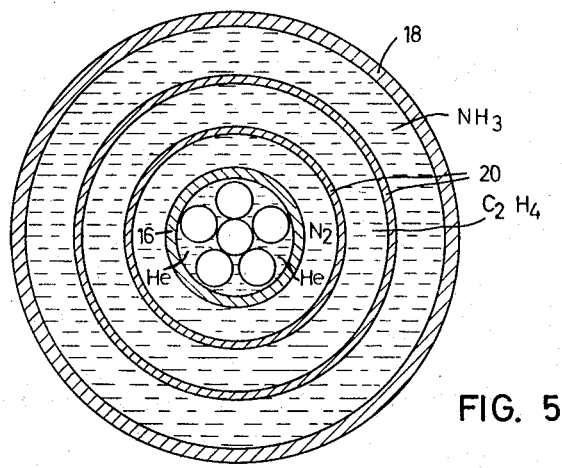

FIG. 5 is a cross-sectional view, corresponding to FIG. 4 and representing an embodiment of the cables in FIGS. 2 and 3, which shows such additional jackets. Here two jackets 20 between tubes 16 and 18 form three chambers containing respectively liquid $N_2$, $C_2H_4$, and $NH_3$, from inside out. This improves the cooling properties of the superconducting system.

Figure 6:
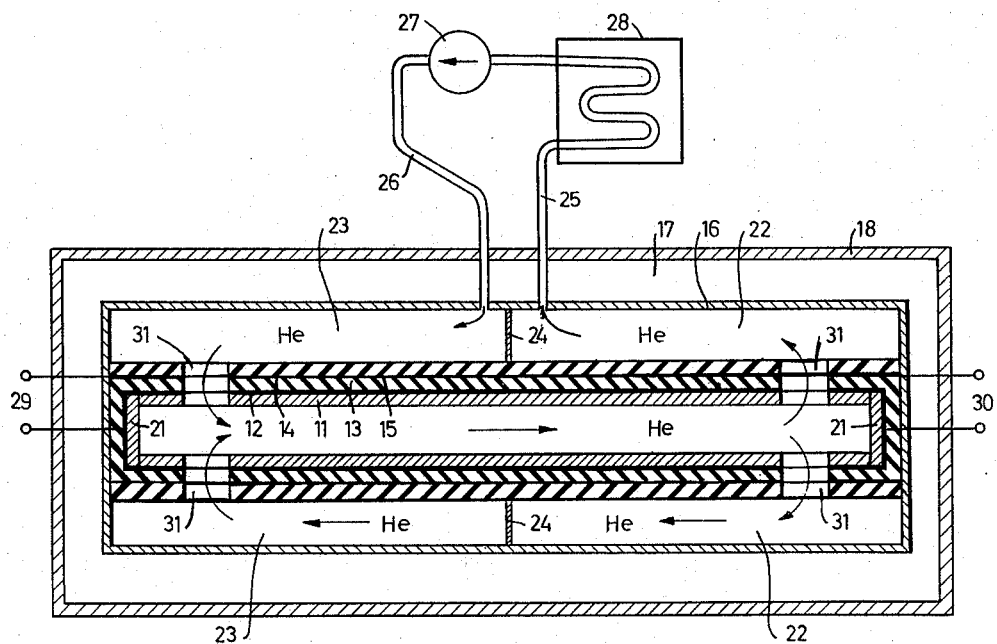
FIG. 6 is a section I—I of FIG. 4.

FIG. 6 shows other details of the cooling system in FIGS. 1 to 4. The section is taken along line I—I in FIG. 4.

The cooling tube 11 is closed at both its ends by means of flanges 21. A separating wall 24 divides the elongated space between the double conductors 11 and the tube 16 into two elongated sectional spaces 22 and 23. A suction tube 25 and a pressure tube 26 of a pumping circuit also including circulation pump 27 and a cooling apparatus 28 in which the helium gas can again be cooled and condensed, connect respectively to the spaces 22 and 23. At both ends of conductor 6 bores 31 form a connection between the fluid helium inside of the tube-shaped tube 11 and the fluid helium in the intermediate spaces 22 and 23 thereby forming a continuous stream of fluid helium in the directions shown. Both superconducting layers 12 and 14 connect with the outer terminals 29 and 30.

Despite the best possible heat insulation a certain amount of helium vaporization will occur in the vicinity of the three-phase current cable so that gaseous helium as well as fluid exists in the cooling spaces. In FIG. 6 the helium is continuously circulated by pump 27. The cooling space in tube 11 connects with the intermediate spaces 22 and 23 at both conduction ends through bores 30. The pump then transports the gaseous helium along the cable to the cooling station 28 which condenses the helium.

While various embodiments of the invention have been shown in detail it will be obvious to those skilled in the art that the invention may be practised otherwise.

I claim:
1. A multi-phase cable arrangement for use between a multi-phase source and a load, comprising lead means for each phase, each of said lead means having spaced opposite ends and including two concentrically-arranged mutually-insulated superconducting tubes positioned as inner and outer conductors, load circuit means for connecting each load phase between the inner and outer ones of the conductors of the corresponding lead means, source circuit means for connecting each phase of the source across the tubes of said respective lead means, and network means for interconnecting said lead means in multi-phase arrangement at only one end of said lead means, said tubes being formed of $Nb_3Sn$.

2. A multi-phase cable arrangement for use between a source and a load, comprising lead means for each phase, each of said lead means having spaced opposite ends one of which is positioned closer to said source and including two concentrically-arranged mutually-insulated superconducting tubes positioned as inner and outer conductors, load circuit means for connecting each load phase between the inner and outer ones of the conductors of the corresponding lead means, and source circuit means at the end of said lead means electrically closer to the source across the tubes of the corresponding tube lead means and for electrically interconnecting the lead means at only the source end thereof in multi-phase arrangement, the inner and outer tubes having diameters whose ratio approaches 1.

3. A multi-phase cable arrangement for use between a source and a load, comprising lead means for each phase, each of said lead means having spaced opposite ends and including two concentrically-arranged mutually-insulated superconducting tubes positioned as inner and outer conductors, load circuit means for connecting each load phase between the inner and outer ones of the conductors of the corresponding lead means, source circuit means for connecting each phase of the source across the tubes of said respective lead means, and network means for interconnecting said lead means in multi-phase arrangement at only one end of said lead means, each of said inner tubes having an interior metallic layer and an outer layer of superconducting material, liquid helium filling said inner tubes, each of said outer tubes having a superconducting layer and two insulating layers jacketing said superconducting layer on each side.

4. A multi-phase cable arrangement for use between a source and a load, comprising lead means for each phase, each of said lead means having spaced opposite ends and including two concentrically-arranged mutually-insulated superconducting tubes positioned as inner and outer conductors, load circuit means for connecting each load phase between the inner and outer ones of the conductors of the corresponding lead means, source circuit means for connecting each phase of the source across the tubes of said respective lead means, network means for interconnecting said lead means in multi-phase arrangement at only one end of said lead means, and heat-insulating means embracing said lead means collectively.

5. A multi-phase cable arrangement for use between a source and a load, comprising lead means for each phase, each of said lead means having spaced opposite ends and including two concentrically-arranged mutually-insulated superconducting tubes positioned as inner and outer conductors, load circuit means for connecting each load phase between the inner and outer ones of the conductors of the corresponding lead means, and source circuit means at the source end of said lead means across the lead of the corresponding tube lead means and for electrically interconnecting the lead means at only the source end thereof in multi-phase arrangement, heat-insulating means embracing a number of said lead means collectively and forming an evacuated chamber of annular cross section.

6. A multi-phase cable arrangement for use between a source and a load, comprising lead means for each phase, each of said lead means having spaced opposite ends one of which is positioned closer to said source and including two concentrically-arranged mutually-insulated superconducting tubes positioned as inner and outer conductors, load circuit means for connecting each load phase between the inner and outer ones of the conductors of the corresponding lead means, and source circuit means at the end of said lead means electrically closer to the source across the tubes of the corresponding lead means and for electrically interconnecting the lead means at only the source end thereof in multi-phase arrangement, heat-insulating means embracing a number of said lead means collectively and comprising two tubular coaxial sheaths filled with a heat-insulating powder.

7. A multi-phase cable arrangement for use between a source and a load, comprising lead means for each phase, each of said lead means having spaced opposite ends one of which is positioned closer to said source and including two concentrically-arranged mutually-insulated superconducting tubes positioned as inner and outer conductors, load circuit means for connecting each load phase between the inner and outer ones of the conductors of the corresponding lead means, and source circuit means at the end of said lead means electrically closer to the source across the tubes of the corresponding lead means, and for electrically interconnecting the lead means at only the source end thereof in multi-phase arrangement, heat-insulating means embracing a number of said lead means collectively and comprising two tubular coaxial sheaths filled with a heat-insulating glass wool.

8. A multi-phase cable arrangement for use between a source and a load, comprising lead means for each phase, each of said lead means having spaced opposite ends one of which is positioned closer to said source and including two concentrically-arranged mutually-insulated superconducting tubes positioned as inner and outer conductors, load circuit means for connecting each load phase between the inner and outer ones of the conductors of the corresponding lead means, source circuit means at the end of said lead means electrically closer to the source across the tubes of the corresponding lead means and for electrically interconnecting the lead means at only the source end thereof in multi-phase arrangement, heat-insulating means embracing a number of said lead means collectively and forming an evacuated chamber of annular cross section, and a polished foil lining the interior of said heat-insulating means.

9. A multi-phase cable arrangement for use between a source and a load, comprising lead means for each phase, each of said lead means having spaced opposite ends and including two concentrically-arranged mutually-insulated superconducting tubes positioned as inner and outer conductors, load circuit means for connecting each load phase between the inner and outer ones of the conductors of the corresponding lead means, source circuit means for connecting each phase of the source across the tubes of said respective lead means, network means for interconnecting said lead means in multi-phase arrangement at only one end of said lead means, and heat-insulating means embracing a number of said lead means collectively and forming a cooling space between said heat-insulating means and said lead means, said cooling space being filled with liquid helium.

10. A multi-phase cable arrangement for use between a source and a load, comprising lead means for each phase, each of said lead means having spaced opposite ends and including two concentrically-arranged mutually-insulated superconducting tubes positioned as inner and outer conductors, load circuit means for connecting each load phase between the inner and outer ones of the conductors of the corresponding lead means, source circuit means for connecting each phase of the source across the tubes of said respective lead means, network means for interconnecting said lead means in multi-phase arrangement at only one end of said lead means, each of said inner tubes having an interior metallic layer and an outer layer of superconducting material, liquid helium filling said inner tube, each of said outer tubes having a superconducting layer and two insulating layers jacketing said superconducting layer on each side, heat-insulating means embracing a number of said lead means collectively and forming a cooling space between said heat-insulating means and said lead means, said cooling space being filled with liquid helium, port means in said lead means for connecting the interior of the inner tube with the cooling space, and pump means connected to said cooling spaced for circulating the liquid helium through the cooling space and the interior of the inner tube.

References Cited by the Examiner

UNITED STATES PATENTS

| | | | |
|---|---|---|---|
| 650,987 | 6/1900 | Ostergren. | |
| 3,162,716 | 12/1964 | Silver | 174—15 |
| 3,163,832 | 12/1964 | Nahman et al. | |
| 3,191,055 | 6/1965 | Swihart et al. | 333—99 |

ORIS L. RADER, *Primary Examiner.*

W. M. SHOOP, *Assistant Examiner.*